United States Patent
Davis et al.

(10) Patent No.: US 7,364,707 B2
(45) Date of Patent: Apr. 29, 2008

(54) PACKING ELEMENT COMPRISING AT LEAST ONE RECESSED PORTION OF SPECIFIC VOLUME AND METHOD OF USING THEREOF

(75) Inventors: Howard Paul Davis, Richmond Surrey (GB); David William Missions, Ashford Kent (GB)

(73) Assignee: Fluid Technologies (Environmental) Limited, Surrey (GB)

( * ) Notice: Subject to any disclaimer, the term of this patent is extended or adjusted under 35 U.S.C. 154(b) by 204 days.

(21) Appl. No.: 10/493,740

(22) PCT Filed: Oct. 23, 2002

(86) PCT No.: PCT/GB02/04769

§ 371 (c)(1),
(2), (4) Date: Oct. 28, 2004

(87) PCT Pub. No.: WO03/035246

PCT Pub. Date: May 1, 2003

(65) Prior Publication Data

US 2005/0258557 A1    Nov. 24, 2005

(30) Foreign Application Priority Data

Oct. 25, 2001    (GB)    .................. 0125668.4

(51) Int. Cl.
*B01J 8/08* (2006.01)
*B01D 47/02* (2006.01)
*B01D 47/04* (2006.01)

(52) U.S. Cl. ........................ 422/141; 261/94; 261/97; 261/108; 261/109; 261/110; 422/311

(58) Field of Classification Search .............. 422/141, 422/311; 261/94, 97, 108, 109, 110
See application file for complete search history.

(56) References Cited

U.S. PATENT DOCUMENTS

| | | | | |
|---|---|---|---|---|
| 2,431,455 A | * | 11/1947 | Blanding | ............. 208/157 |
| 3,159,910 A | | 12/1964 | Lehmer et al. | |
| 3,365,180 A | * | 1/1968 | Lerner | ............. 261/94 |
| 4,203,934 A | * | 5/1980 | Leva | ............. 261/98 |
| 4,472,358 A | * | 9/1984 | Khudenko | ............. 422/141 |
| 4,511,519 A | * | 4/1985 | Hsia | ............. 261/94 |
| 4,608,181 A | * | 8/1986 | Hsiung et al. | ............. 210/786 |
| 5,130,062 A | * | 7/1992 | Riemer | ............. 261/97 |
| 5,413,749 A | * | 5/1995 | Geiser | ............. 264/293 |
| 5,588,986 A | | 12/1996 | Davis et al. | |
| 5,718,846 A | | 2/1998 | Dummersdorf | |

FOREIGN PATENT DOCUMENTS

| | | |
|---|---|---|
| DE | 366823 | 12/1921 |
| DE | 366 823 | 1/1923 |
| DE | 448 380 | 8/1927 |
| DE | 448380 | 8/1927 |
| DE | 727 276 | 10/1942 |
| DE | 727276 | 10/1942 |
| WO | WO 94/29019 | 12/1994 |

* cited by examiner

*Primary Examiner*—H. T Le
(74) *Attorney, Agent, or Firm*—Fay Kaplun & Marcin, LLP

(57) ABSTRACT

A packing element for use in a fluidised bed includes a continuous surface with at least one recessed portion. The recessed portion has a volume in the range of 0.2 to 30% of the volume of the packing element itself.

24 Claims, 4 Drawing Sheets

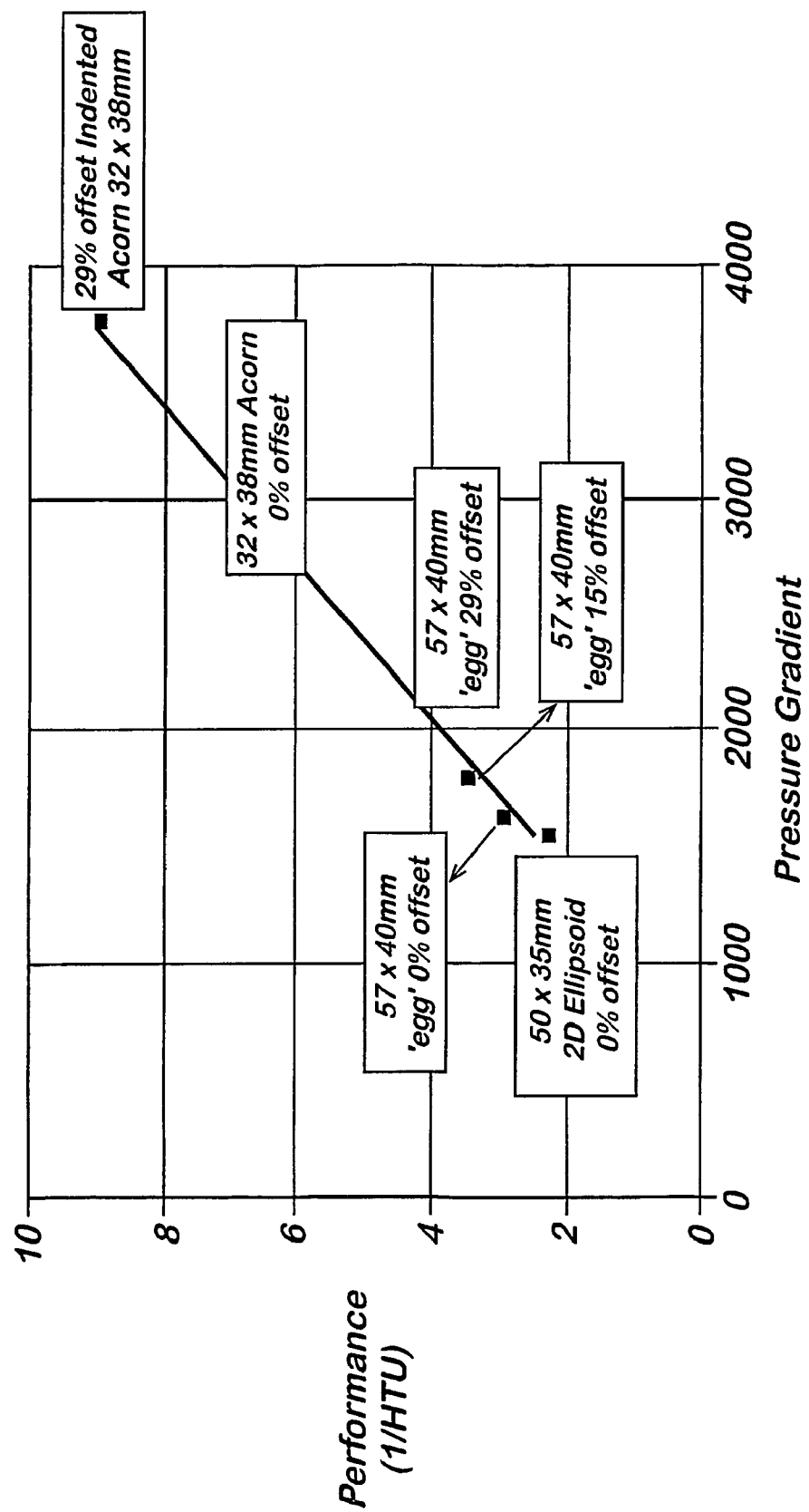

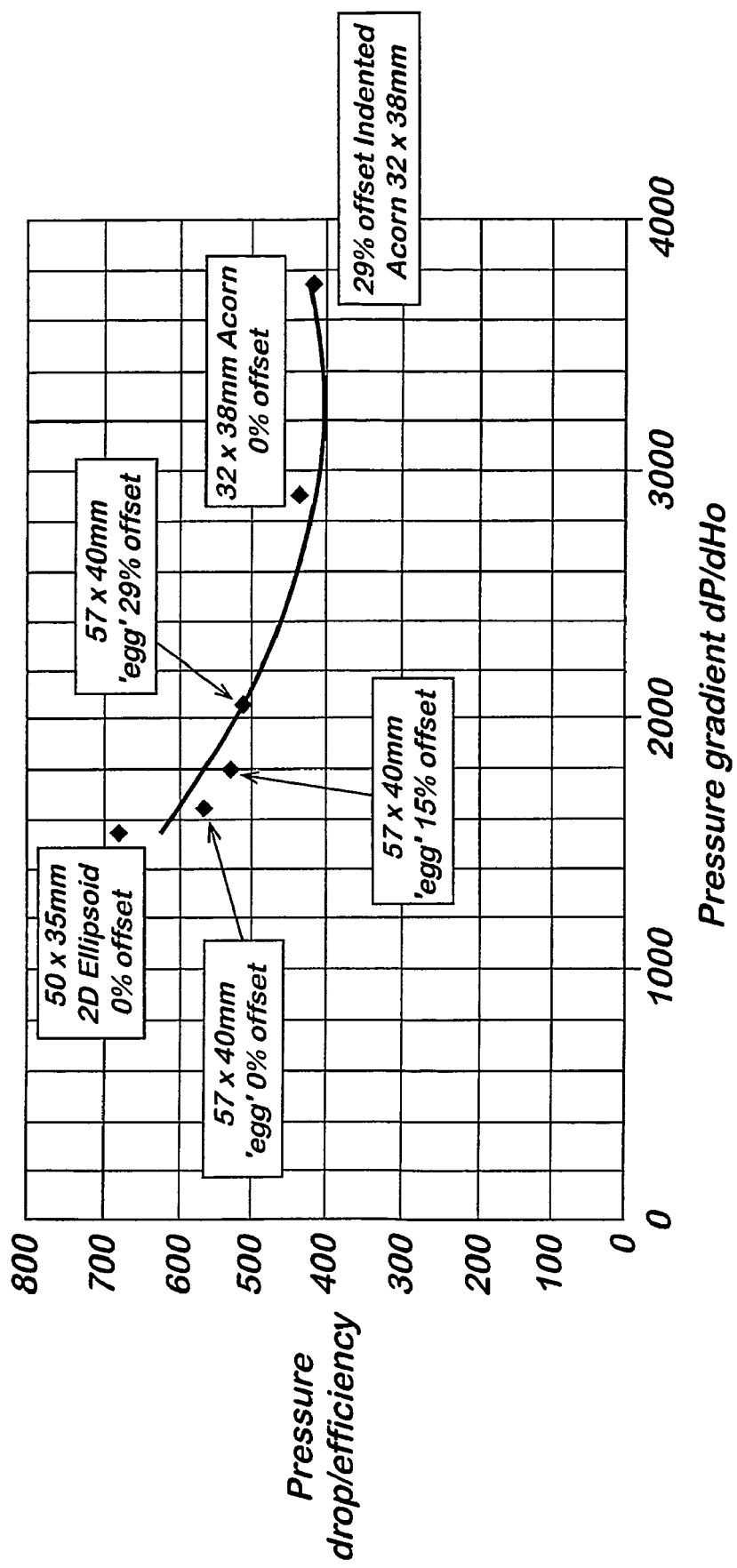

PACKING ELEMENT COMPRISING AT LEAST ONE RECESSED PORTION OF SPECIFIC VOLUME AND METHOD OF USING THEREOF

FIELD OF INVENTION

This invention relates to packing elements for use in a fluidised bed for the treatment of fluid streams.

BACKGROUND INFORMATION

In a typical treatment operation a gas stream is passed upwards through a treatment column, such as a scrubbing tower, and a liquid stream passes downwards through the column countercurrent to the gas. One or both of the fluid feed streams may contain contaminants, which may be gaseous, liquid or solid. On contact between the fluid streams there occur mass and energy transfers at a rate affected by a number of factors including the respective stream temperatures and the extent of contact. The transfers can be improved by the presence of packing elements in the column and this is especially the case if the gas is passed upwards at a velocity sufficient to fluidise the packing elements. The so-formed fluidised bed of packing elements represents turbulent conditions which increase the contact between the fluids and therefore further increase the mass and energy transfer.

Such fluidised bed operations include one or more of absorption, desorption, distillation, heat transfer for heating or cooling, scrubbing, stripping, and particulate or droplet transfer.

Improvements in transfer rates in fluidised beds are much sought after. The aim is to improve energy efficiency of the bed, and thus to increase the performance of a given column and bed or to maintain a given performance while reducing column size and/or bed volume.

Historically the packing elements were typically in the form of hollow spheres. It has been however been shown that non-spherical shapes may be more energy-efficient. Compared with spherical elements these alternative shapes provide an enhanced tumbling action which increases the turbulence imparted to the fluid streams and thus improves the contact between them. German patent specification No. 3613151-A shows improvements in scrubbing efficiencies by using ellipsoidal elements. PCT patent specification WO91/08048 describes elements with their centre of gravity offset from the centre of symmetry (COG/COS offset) to enhance their tumbling motion. U.S. Pat. No. 5,588,986 further teaches that using COG/COS offset, varying the size, shape and density of the element, and controlling the velocities of the gas and liquid streams permits control of the tumble velocity and thus of the transfer rate.

The tumble velocity can be determined by the pressure gradient (quantified as pressure drop $\Delta P$ over the settled or pre-fluidised bed height $H_o$) across elements in the fluidised bed, whereby the higher the pressure gradient across the elements, the higher the tumble velocity for a given element. There is however a limit to the tumble velocity that can be achieved by varying the density and COG/COS offset.

Increases to the pressure gradient by different means, for example by increasing element density alone, without an increase in tumble velocity can lead to a loss in energy efficiency characterised by high pressure drop ($\Delta P$) per number of transfer units (NTU).

SUMMARY OF INVENTION

It is therefore an object of the present invention to increase further the transfer efficiency of a fluidised bed and in particular to increase the tumble velocity of the bed packing elements.

According to the invention there is provided a packing element for use in a fluidised bed, wherein the packing element has a continuous surface with at least one recessed portion, the recessed portion(s) having a volume in the range 0.2 to 30% of the volume of the packing element itself.

Recessed packing elements according to the invention display an improved tumbling action over the prior art. The recess, otherwise described herein as an indentation, acts both to capture down-coming liquid when the recess is facing upwards and to capture rising gas when the recess is facing downwards. Both attributes have the effect of increasing the rotation or tumbling rate. When the recess is in the upward position the captured liquid increases the effective density of the element and raises its centre of gravity, thereby increasing the pressure gradient across the element and causing it to tumble at an increased velocity. The increase in tumble velocity increases the amount of turbulence in the gas and liquid streams, which in turn increases eddy mass transfer and the inter-fluid contact.

The slug of liquid captured in the recess is released when the element tumbles, falling into upward-facing recesses in elements at a lower level in the bed. The falling liquid thus contributes to increasing tumble velocity at every point through the bed at which it falls into an element recess. Similar benefits are achieved by the gas rising through successive contact with elements at higher levels in the bed.

The presence of the recesses thus improves inter-fluid contact throughout the bed, with consequent improvements in mass and energy transfer rates. Indeed the use of packing elements according to the invention has the surprising effect of not increasing the pressure gradient by more than 30% even at liquid to gas volume ratios greater than 4 $dm^3/m^3$ over the same outline shape without a recess. Liquid hold up in the bed is increased by up to 40% even at liquid to gas ratios below 4 $dm^3/m^3$ whereas pressure gradients remain comparable. The increased liquid hold up and/or pressure gradient contribute to increases in tumbling rate or surface renewal rate and interfacial surface area of up to 40% when compared to a non-indented element of equivalent size, density and non indented outline shape.

The overall effect is the boosting of mass and heat transfer by up to 70% for the same pressure loss or energy consumption or the reduction of the static pre-fluidised bed height ($H_o$) and expanded bed height ($H_x$) by up to an additional 40% over existing tumbling fluidisable elements.

The packing element is preferably of hollow plastic material, for example polypropylene, polyethylene or polyvinyl difluoride (PVDF). Other lightweight solid or hollow materials may alternatively be suitable.

The basic outline shape of the packing element may be of any three-dimensional form: parallelepipedal, including cubic and cuboid; cylindrical, for example rod-shaped with a circular cross section; conical or frusto-conical; parabaloidal; star-shaped; spherical; ellipsoidal; or similar types, and may be symmetrical or asymmetrical.

Preferably the basic shape of the packing element is ellipsoidal, most preferably asymmetric ellipsoidal, for example egg-shaped, ovoidal or acorn-shaped.

Each recess represents a depression or indentation in the surface of the basic element shape. The shape of each recess per se must be such as to capture falling liquid or rising gas.

A variety of recess shapes satisfy this requirement, including straight-sided shapes and concave dish shapes.

The transverse dimensions of the recess may be equal or unequal, the latter presenting a recess of elongated shape. One instance of elongated recess is an annular recess extending around the circumference of the surface of the packing element.

Multiple recesses may be present in each packing element but in general one or two recesses are preferred. The most preferred element according to the invention is an element of ellipsoidal shape with either a single recess which is located at one end of the longest axis of the shape, or two recesses on opposing faces.

The packing element is preferably directly moulded, for example by blow moulding or injection moulding, into its final shape including the required recess(es). Alternatively the element can be first formed into its basic shape and appropriate indentations can then be applied to form the recess(es). The convenience of manufacturing is an important aspect of the chosen final shape since the elements are required in large numbers for their fluidised bed duties and must be capable of being manufactured in a cost-effective way. The choice of final shape is thus a balance between best operational performance and ease of manufacture.

The shape factor of the recessed element, defined herein as ratio between its shortest and longest axes, is preferably in the range 0.3 to 0.9 for indented basic outline shapes or in the range 0.3 to 1.0 for naturally indented shapes. Shapes with a ratio outside these ranges may lead to less efficient transfer rates.

The term "volume" as used herein in relation to the packing element as a whole is the displacement volume of the whole enclosed recessed packing element, and in relation to the recess(es) per se is the total volume of the respective depression(s) compared with the shape the element would have without the depression(s). The volume of the recess(es) can thus be regarded as the "free" or "fill" volume of the element. The recesses must have a total free or fill volume in the range 0.2 to 30%, preferably 1 to 15%, of the volume of the whole enclosed packing element.

The invention further provides a method of scrubbing, stripping, heat transfer, particulate transfer or distillation, in a column wherein a gas stream and a liquid stream are passed in directions counter-current to each other through a fluidised bed comprising packing elements as described and claimed herein.

Several factors other than the shape of packing elements must be taken into account in the performance of a column employing them. Among these is the size of the elements. In this regard the length of the longest axis of the elements is preferably within the range 10 to 125 mm. The effective density of the recessed element is preferably in the range 100 to 500 kg/m$^3$. Elements falling outside these ranges may lead to less efficient transfer rates.

The transfer rates are also affected by the liquid to gas volume ratio and the gas velocity in the column. The fluidised bed is preferably operated at pressure gradients ($\Delta P/H_o$) above 900 Pa/m. The gas velocity range is preferably 0.2 to 10 m/s and the liquid to gas volume ratio is preferably 0.1 to 50 dm$^3$/m$^3$.

BRIEF DESCRIPTION OF DRAWINGS

The invention is further described by way of non-limiting example with reference to the following figures:

FIG. 4 illustrates a graph showing the performance of various packing elements, some according to the present invention; and FIG. 5 illustrates a graph showing the energy efficacy of packing elements shown in FIG. 3.

DETAILED DESCRIPTION

Figure 1:
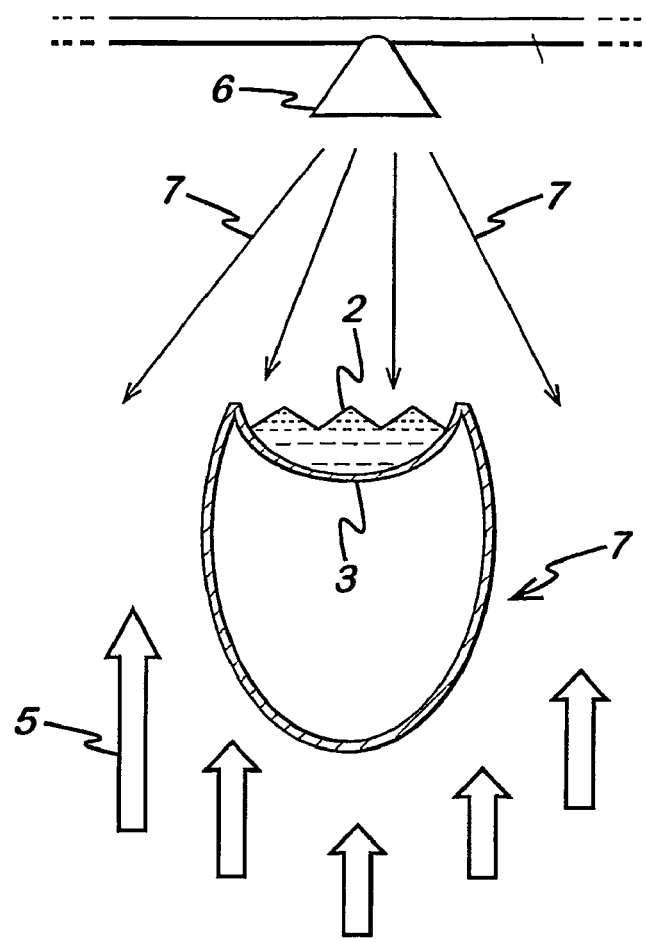
FIG. 1 shows a cross-sectional view of a recessed packing element according to an exemplary embodiment of the present invention shown within a scrubbing tower.

FIG. 1 shows a cross-sectional view of a packing element according to the invention in a scrubbing column. The packing element 1, of moulded polypropylene, is of a substantially ellipsoidal basic shape with a recess 3 in which a fluid can collect, shown here containing captured liquid 2. A gas stream to be treated is represented by the arrows 5, flowing upwards through the column.

A treatment liquid is introduced into the column from an inlet 6 in an initial direction indicated by arrows 7. The vicinity around the element 1 is shown in schematic form. The element 1 has a displacement volume of 22.5 ml. The recess 3, measured relative to an equivalent ellipsoid with an upper envelope of the same shape as the illustrated lower envelope, has a volume of 5.7 ml, i.e. about 25% of the element volume. The density of the element 1 with no captured liquid in the recess 3 is 220 kg/m$^3$, rising instantaneously to 260 kg/m$^3$ when the recess 3 is filled to capacity with liquid 2.

Figure 2:
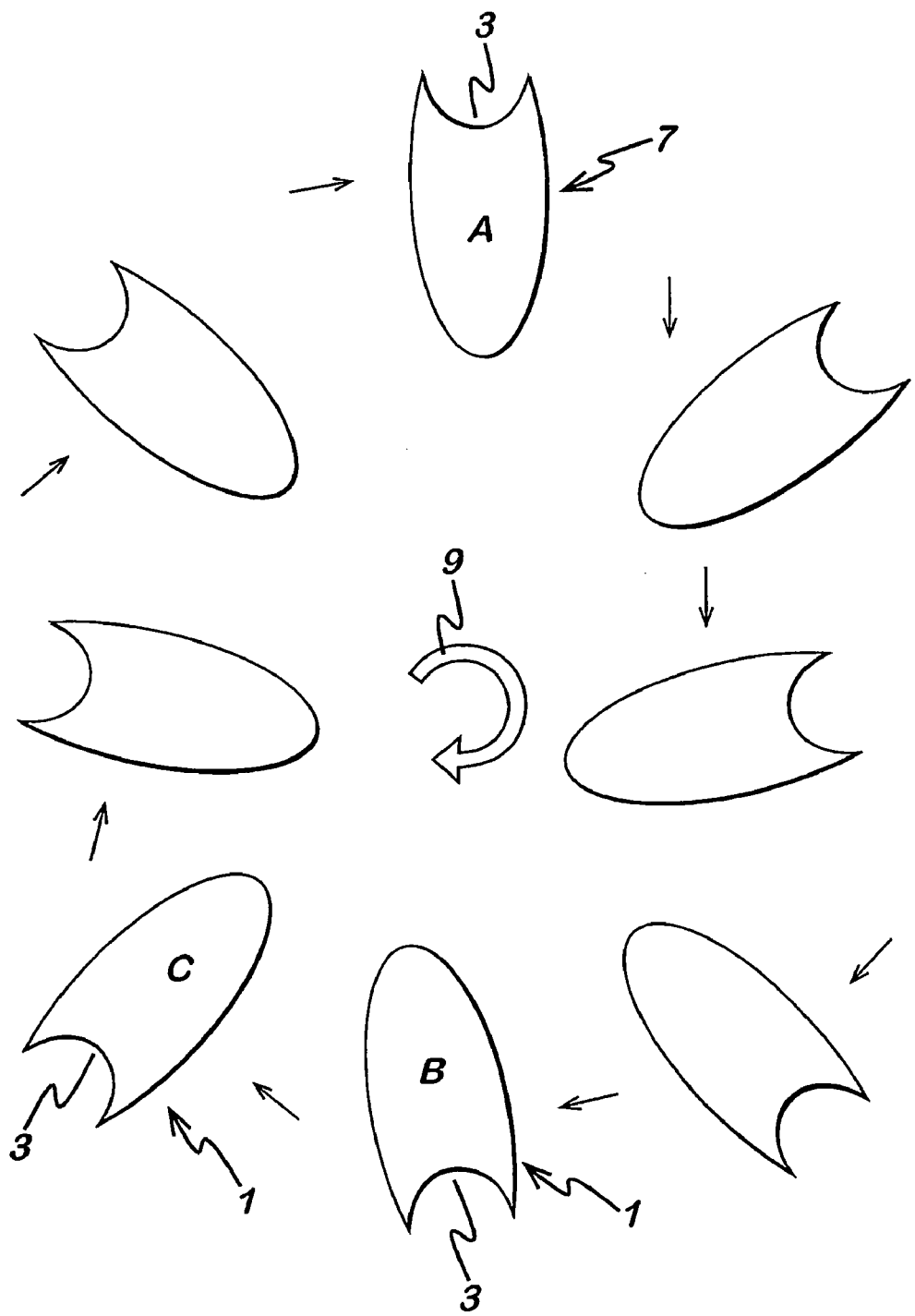
FIG. 2 shows a cross-sectional view of a recessed packing element of the type illustrated in FIG. 1 and shown in various positions during tumbling.

FIG. 2 shows the tumbling action of the element 1. At point A the element has its recess 3 uppermost. The element 1 then tumbles in a direction denoted by arrow 9 until it has turned through 180° to point B, when the recess is lowermost.

When the recess 3 is at point A it gathers liquid from the down-flowing liquid 7 whilst being buffeted by the rising gas stream 5. The captured liquid 2 causes an increase in the density of the upper part of the element which increases the pressure gradient. The element 1 tumbles from position A, the extra weight of the liquid 2 on the descending side of the element 1 increasing the tumble velocity.

The liquid 2 in the recess 3 is displaced by the movement and by point B the recess 3 has entirely emptied of liquid. Now at the bottom of the element 1, the recess 3 acts as a lip for the rising gas stream 5 to push the element back rapidly towards its upright position A.

Figure 3:
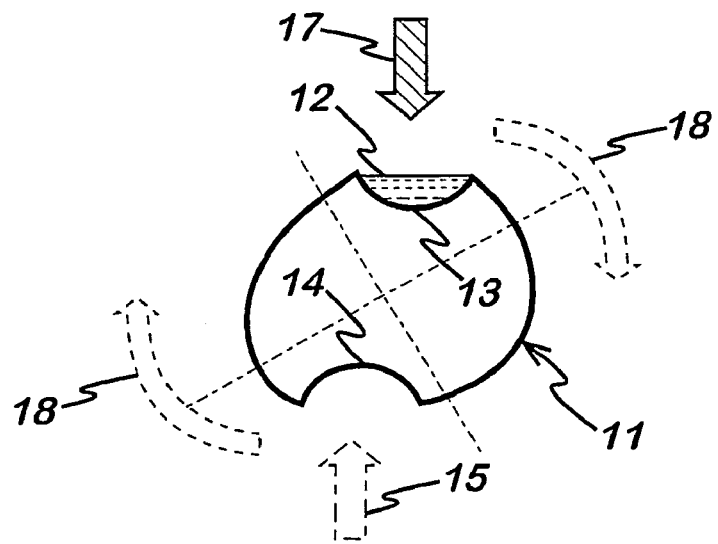
FIG. 3 shows a cross-sectional view of a second type of recessed packing element according to the present invention, in this instance with two recesses.

FIG. 3 shows a cross-sectional view of a second version of packing element according to the invention. This packing element 11, also of moulded polypropylene, is of a substantially spherical basic shape but has two opposing recesses 13 and 14. The recess 13 is shown containing captured liquid 12.

An upwardly-flowing gas stream to be treated is represented by the arrow 15.

Treatment liquid passes downwards as indicated by the arrow 17.

The element 11 is thus simultaneously subjected to the effects of captured liquid 12 in recess 13 and captured gas in recess 14. Tumbling of the element 11 in the direction indicated by arrows 18 is thus increased by both these effects.

The FIG. 4 graph shows the performance (measured as the inverse of the height of a transfer unit ($HTU^{-1}$, with units of $m^{-1}$), against the pressure gradient ($\Delta P/H_o$, with units of Pa/m) for elements in a fluidised bed. The total packing height requirement is the product of the height of a transfer unit (HTU) and number of transfer units (NTU). The graph effectively compares the relative bed heights of the packing elements, including a perfect 2D (two-dimensional) ellipsoid (oblate spheroid), ovoidal ellipsoids such as 'birds eggs' and 'acorns' both with and without COG/COS offset, and an indented 'acorn' shape. The lower bed heights represent better transfer efficiency.

By taking ratios of $1/HTU^{-1}$ or HTU the relative bed heights are apparent and it can be seen that the lowest bed heights were most easily attainable with the indented acorn (TurboPak®) element having a 29% COG/COS offset and an indentation of 5.6% of the basic element. The next best element in terms of the $\Delta P/NTU$ ratio was the 0% offset whole-acorn shape marketed as Turboid®, although this element was much inferior in terms of effective bed height ($HTU^{-1}$).

FIG. 5 shows the energy efficacy in a fluidised bed of the packing elements of FIG. 4 by comparing their pressure drop/efficiency ($\Delta P/NTU$) with their pressure gradient ($\Delta P/H_o$) measured in a system absorbing acetone at 20° C. It is clear that the 29% offset, 5.6% indented acorn is at or near a minimum point in terms of energy required to achieve a certain absorption efficiency. It is better than the 0% offset non-indented 38×32 mm acorn and substantially better than the oblate spheroid and ovoidal 'egg' shapes tested. This shows that both bed heights and pressure drops are improved by the elements of the invention over existing fluidisable packing elements.

Tests were undertaken to compare a 38 mm×32 mm 5 gram 29% indented 'acorn' shape (TurboPak®) against a 57 mm×40 mm 7 gram 'bird's egg' shape.

Whilst the latter larger element had the advantage of a longer semi-axis and 29% COG/COS offset to increase its tumbling rate this was to some extent balanced by the higher density of the non offset outline smaller element.

With a gas flow velocity of 3.8 m/s and a liquid to gas ratio of 3 litres/m³ in a system absorbing acetone at 20° C. there was a surprising improvement in performance of 125% over the 'egg' when measured in terms of mass or heat transfer coefficient ($HTU^{-1}$)

The invention claimed is:

1. A packing element for use in a fluidised bed in which a gas stream and a liquid stream pass in counter-current directions to each other, comprising:
   a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein the packing element is composed of a hollow plastic material, the material being composed of one of polypropylene and polyethylene and polyvinyl difluoride (PVDF).

2. A packing element according to claim 1, wherein a basic outline shape of the packing element is one of parallelepipedal, cylindrical, conical, frusto-conical, parabaloidal, star-shaped, spherical and ellipsoidal.

3. A packing element according to claim 1, wherein the basic shape is asymmetrical.

4. A packing element according to claim 1, wherein the basic shape is one of egg-shaped, ovoidal and acorn-shaped.

5. A packing element according to claim 1, wherein a shape of the at least one recessed portion is one of straight-sided, concave and annular.

6. A packing element according to claim 1, wherein the packing element has a longest axis and the recessed portion is located at one end of that axis.

7. A packing element for use in a fluidised bed in which a gas stream and a liquid stream pass in counter-current directions to each other, comprising:
   a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein a length of a longest axis of the packing element is between 10 mm and 125 mm.

8. A packing element for use in a fluidised bed in which a gas stream and a liquid stream pass in counter-current directions to each other, comprising:
   a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein when the packing element has a first shape, the at least one recessed portion includes a first recessed portion situated at a first end of the packing element, the first shape including one of a basic ellipsoidal shape and a shape substantially similar to the basic ellipsoidal shape and wherein when the packing element has a second shape, the at least one recessed portion includes the first recessed portion situated at the first end of the packing element and a second recessed portion situated at a second end of the packing element, the first end being situated opposite the second, the second shape being any shape other than the first shape.

9. A packing element for use in a fluidised bed in which a gas stream and a liquid stream pass in counter-current directions to each other, comprising:
   a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein a volume of the at least one recessed portion is between 1 and 15% of the volume of the packing element.

10. A packing element for use in a fluidised bed in which a gas stream and a liquid stream pass in counter-current directions to each other, comprising:
    a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein a shape factor is one of: (I) between 0.3 and 0.9 for an indented basic outline shape and (ii) between 0.3 and 1.0 for a naturally indented shape.

11. A packing element for use in a fluidised bed in which a gas stream and a liquid stream pass in counter-current directions to each other, comprising:
    a continuous surface with at least one recessed portion, the at least one recessed portion having a volume between 0.2 and 30% of a volume of the packing element, the packing element being arranged to and being shaped such as to capture at least one of liquid from the liquid stream and gas from the gas stream, wherein an effective density of the packing element is between 100 and 500 kg/m$^3$.

12. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein a velocity of the gas upwards through the column is between 0.2 and 10 m/s.

13. A method for at least one of absorption desorption, distillation, beat transfer, scrubbing, stripping and particulate transfer in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein a liquid to gas volume ratio is between 0.1 and 50 dm$^3$/m$^3$.

14. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the liquid stream is falling and capture of falling liquid in a recessed portion of the packing element causes a change in the effective density of the packing element.

15. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shared such as to capture at least one of liquid from the liquid stream and gas from the gas stream, wherein the gas stream is rising and the capture of rising gas in a recessed portion of the packing element causes a change in the effective density of the packing element.

16. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the liquid stream is falling and the capture of falling liquid in a recessed portion of the packing element causes a change in the centre of gravity of the packing element.

17. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the gas stream is rising and the capture of rising gas in a recessed portion of the packing element causes a change in the centre of gravity of the packing element.

18. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein a change in the centre of gravity of the packing element cause the packing element to tumble.

19. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the liquid stream is falling and the capture of falling liquid in the recessed portion of the packing element causes the packing element to tumble.

20. A method as claimed in claim 19, wherein the captured liquid is released as the packing element tumbles.

21. A method for at least one of absorption, desorption, distillation, heat transfer, scrubbing stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the gas stream is rising and the capture of rising gas in the recessed portion of the packing element causes the packing element to tumble.

22. A method as claimed in claim 21, wherein the captured gas is released as the packing element tumbles.

23. A method for at least one of absorption desorption distillation, heat transfer, scrubbing, stripping and particulate transfer, in a column, the method comprising the step of:

passing a gas, stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the liquid stream is falling and the gas stream is rising and the capture of falling liquid and rising gas in the recessed portion of the packing element causes the packing element to tumble.

24. A method for at least one of absorption, desorption, distillation, heat transfer, scrubbing, stripping and particulate transfer, in a column, the method comprising the step of:

passing a gas stream and a liquid stream in directions counter-current to each other through a fluidised bed which includes a packing element, the packing element including a continuous surface with at least one recessed portion having a volume between 0.2 and 30% of a volume of a packing element, and being shaped such as to capture at least one of liquid from the liquid stream and gas from the gas stream, wherein the liquid stream is falling and the gas stream is rising and the capture of at least one of falling liquid or rising gas causes the packing element to tumble, the tumbling motion causing turbulence in the gas and liquid streams.

\* \* \* \* \*